United States Patent [19]
Blatter et al.

[11] Patent Number: 6,133,344
[45] Date of Patent: Oct. 17, 2000

[54] COLORED POWDERY COATING MASS

[75] Inventors: Karsten Blatter, Erftstadt; Peter Simon, Eppstein, both of Germany

[73] Assignee: Aventis Research & Technologies GmbH & Co. KG, Frankfurt, Germany

[21] Appl. No.: 09/367,474

[22] PCT Filed: Feb. 11, 1998

[86] PCT No.: PCT/EP98/00746

§ 371 Date: Aug. 13, 1999

§ 102(e) Date: Aug. 13, 1999

[87] PCT Pub. No.: WO98/36030

PCT Pub. Date: Aug. 20, 1998

[30] Foreign Application Priority Data

Feb. 17, 1997 [DE] Germany .......................... 197 05 960

[51] Int. Cl.$^7$ ..................................................... C08L 33/00
[52] U.S. Cl. ........................................... 523/221; 524/878
[58] Field of Search ............................. 524/878; 523/221

[56] References Cited

FOREIGN PATENT DOCUMENTS 0 459 048 B1  12/1991  European Pat. Off. .

OTHER PUBLICATIONS

Patent Abstract of Japan No. 07188586 dated Jul. 25, 1995.

Patent Abstract of Japan No. 08143788 dated Apr. 6, 1996.

*Primary Examiner*—Edward J. Cain
*Attorney, Agent, or Firm*—Frommer, Lawrence & Haug, LLP

[57] ABSTRACT

A colored pulverulent coating composition comprising spherical particles having a mean particle size >40 μm, in two or more different color tints, where at least the particles of one color tint are colored and the particles of the other color tint may be colorless. The particles employed for the mixture each have a monomodal particle size distribution with a span (d90-d90/d50) of ≦2.5. Furthermore the pulverulent coating composition can be melted at temperature <200° C. to form a continuous coating, the differences in color which stem from the different-colored particles being indistinguishable to the human eye in the cured coating. The mean particle size (d50) of the spherical particles is preferably in the range from 40 μm to >10 μm. The novel coating composition can be used to produce coatings having a thickness of <50 μm.

7 Claims, No Drawings

COLORED POWDERY COATING MASS

The present invention relates to colored, pulverulent coating compositions comprising spherical particles having a mean particle size <40 µm and a monomodal particle size distribution with a span (d90-d10/d50) of ≦2.5. The novel coating compositions can be melted at temperatures <200° C. to form a continuous coating and are particularly suitable for use as powder coatings.

Powder coatings consist in general of a film-forming polymer which is crosslinkable if desired, of additives, for example flow improvers or devolatilization auxiliaries, and, in the case of colored powder coatings, of one or more pigments or dyes and fillers.

Powder coatings are traditionally prepared by mixing the abovementioned components thoroughly in an extruder at a temperature which is above the softening temperature of the film-forming polymer but below the crosslinking temperature and then bringing the resulting extrudate to a particle size of from about 40 to 70 µm by means of a milling process.

A key disadvantage of powder coatings in comparison with liquid coating systems is the fact that it is necessary to establish the color of the powder coating during the preparation of the extrudate, prior to the milling process, by appropriate metering of color-imparting components. Altering the shade in the finished powder by blending different-colored powders has to date not been possible because, owing to the particle size of the powders from the milling processes employed to date, the human eye is still able to distinguish, in the finished coating, the individual colors employed for the blend, and thus of the coating gives a nonuniform impression (D.A. Bate, "The Science of Powder Coatings" page 17, SITA, UK 1990 ISBN 0 9477798005).

For liquid coatings, on the other hand, it is usual to prepare paints in various base colors and to establish the shade required at the time by blending these base colors. This procedure has the advantage that it is only necessary to stock the base colors. The logistical complexity is therefore much less than for conventional powder coating systems, where each shade must be prepared specifically and where it is impossible to correct color deviations caused, for example, by fluctuations in the quality of the raw materials employed.

For this reason there has been no lack of attempts already, in the past, to overcome these disadvantages of powder coatings. For example, EP-B-0 459 048 describes a process for preparing colored powder coatings by blending ultrafine particles having a size <20 µm which are obtained by extensive milling processes. In the case of the coating compositions described here it is necessary for essentially all of the particles to have a particle size of 20 µm, in particular <15 µm. The disadvantage of the coating compositions disclosed is, in particular, that particles having a size of less than 15 µ can no longer be processed by the electrostatic spray process. The state of affairs is essentially due to the irregular structure of the particles obtained in milling processes. The colored particles mentioned above must therefore be agglomerated, in an additional process step prior to their application as a powder coating, to form larger particles having a diameter of about 30 µm or more. This additional process step entails considerable expense. In particular, establishing the color of a powder coating by simple mixing of two or more colored powders, without aftertreatment, is not possible in accordance with this process either.

The average particle diameter of a powder, and the breadth of the particle size distribution, are characterized using not only the parameter d50, for which precisely 50% of the particles are smaller or larger than the value d50, but also two other parameters, d10 designates the particle size for which 10% of the particles are smaller than this value. Correspondingly, d90 designates the particle size for which 90% of the particles are finer than the value d90. To characterize the breadth of a particle size. distribution it is common to form a quotient, which is referred to as the span and is calculated in accordance with the following formula; span—d90-d10/d50. The relationship is thus: the smaller the span, the narrower the particle size distribution. A powder formed from identical particles would have a span of 0. For milled powders of the prior art, with a mean particle size d50 of 50 µ, a span of 3–4 is typically obtained.

It has now been found that coating compositions comprising colored, non-porous, spherical powder coating particles with a mean size of <40 µm and a narrow particle size distribution can be processed in a simple manner using electrostatic spray technique to form homogeneously colored coatings.

The present invention therefore provides pulverulent coating compositions comprising spherical particles having a mean particle size <40 µm, in two or more different color tints, where at least the particles of one tint are colored and the particles of the other tint may be colorless, and the particles employed for the mixture each have a monomodal particle size distribution with a span (d90-d10/d50) of ≦2.5 and the pulverulent coating composition can be melted at temperatures <200° C. to form a continuous coating, the differences in color which stem from the different-colored particles being indistinguishable to the human eye in the cured coating.

The present application additionally provides a process for preparing colored pulverulent coating compositions having a desired color by providing at least one coating composition in a base color and at least one further, differently colored or colorless, coating composition and mixing the coating compositions. In this system, each of the coating compositions employed comprises spherical particles having a mean particle size <40 µm. When the mixed coating composition obtained is applied to the substrate at temperatures <200° C., a continuous coating in the desired color is formed, in which the differences in color which stem from the different particles are indistinguishable to the human eye.

The establishment of the desired color of the novel colored, pulverulent coating composition is accomplished by blending at least two different colored pulverulent coating compositions, one of which may if desired be colorless. In many cases, however, three or more coating compositions in different tints are required in order to establish a specific shade. Through the use of a colorless coating composition, or one provided with filler, as a blend component it is possible in this way to establish the color strength of a mixture; that is, to produce relatively light shades as well.

Pulverulent coating compositions which are suitable as starting components for the novel mixing process can be prepared, for example by a dispersion method. By appropriate choice of the reaction conditions it is possible to obtain powders having a narrow particle size distribution.

A process for preparing the spherical transparent or colored powders required for the novel coating compositions, having a mean particle size <40 µm and a span ≦2.5, is described in the German Patent Applications 19705961.9 and 19705962.7, which are of equal priority and which are expressly incorporated herein by reference.

Thus, for example, the coating compositions employed in accordance with the invention, which comprise homogeneously colored, spherical particles and which are crosslinkable if desired, can be prepared by a. dispersing the starting materials for a polyester binder in an inert high-boiling heat transfer medium at a temperature which is at least as high as the softening temperature of the starting materials, in the presence of at least one polymeric, preferably organic, dispersion stabilizer, and b. then heating the reaction mixture to a temperature in the range from 120 to 280° C. while at the same time removing the condensation by-products, until the polyester has the desired molecular weight;

c. subsequently, in the temperature range in the range from 140 to 220° C., adding dyes, pigments and/or fillers and any further additives;

d. in the case of a crosslinkable functional polyester, thereafter cooling the reaction mixture to a temperature in the range from 60 to 140° C. and adding at least one polyfunctional crosslinking agent or epoxy resin, and e. subsequently reducing the temperature to a range which is below the softening temperature of the polyester, and separating off the resulting homogeneously colored, spherical polyester particles.

As starting materials for the abovementioned coating compositions it is preferred to employ oligoesters having a viscosity of less than 1000 mPas (measured at 200° C.), in particular ≦500 mPas.

The different-colored pulverulent coating compositions are mixed by means of extremely simple mechanical mixing devices, such as tumblers or shakers, or by conjoint fluidization of the powders in a fluidized bed as is employed, for example, for electrostatic spraying techniques.

Factors determining the quality of the novel coating compositions are, in particular, the spherical form of the particles that are to be mixed and their particle size distribution.

The novel coating composition comprises spherical particles having a mean particle size <40 μm, preferably <30 μm. The mean particle size (d50) of the spherical particles should be in the range from 40 to >10, in particular from 35 to 20 μm. If the upper mean particle size of 40 μm is exceeded it is no longer possible to prepare thin coatings with thicknesses <50 μm. Moreover, for powders having a mean particle size of markedly more than 40 μm, the differences in the color of the coating become noticeable to the human eye.

Even very fine powders comprising spherical particles having a mean size of less than 20 μm can be processed without problems by the electrostatic spraying techniques which are customary for powder coatings, and lead to particularly thin coatings having a very uniform surface.

The spherical particles present in the novel colored, pulverulent coating composition have a monomodal particle size distribution with a span (d90-d10/50) of ≦2.5, in particular ≦2.0, preferably ≦1.5. The particular narrow particle size distribution of the novel coating composition prevents coarse fractions leading to nonuniformity of the coating. As a result, just simple physical mixing of the powders present in the coating composition gives the impression, to the human eye, of a homogenously colored powder.

The colored particles present in the coating composition preferably comprise units for the formulae (1) and (2)

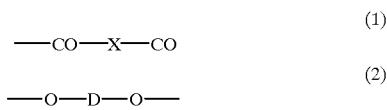

where
X is a substituted or unsubstituted $C_6$ to $C_{14}$ aromatic radical or an alkylene, polymethylene, cycloalkane or dimethylene cycloalkane group or a straight-chain or branched, saturated or unsaturated alkanediyl group and D is an alkylene, polymethylene, cycloalkane or dimethylene cycloalkane group or a straight-chain or branched, saturated or unsaturated alkanediyl group.

As binders for the above-described coating compositions it is preferred to employ polyesters, which if desired are crosslinkable. However, other known binders, for example based on polyurethane, epoxide or polyacrylate, can also be employed for the mixing process.

The coating compositions obtained by mixing the different-colored powders require no aftertreatment and can be processed directly by the customary methods to form coatings. Because of their uniform particle size distribution the novel powders are particularly suitable for processing by the electrostatic spraying technique.

For instance, after application to a suitable surface, the novel colored coating compositions can be melted at temperatures below 200° C., in particular at temperatures in the range from 120 to 200° C., preferably from 160 to 200° C. to give a continuous coating, which if a coating composition comprising a crosslinkable binder system has been employed for blending can also be cured at these temperatures.

Because of their narrow particle size distribution the colored coating compositions of the present invention lend themselves outstandingly to processing by the customary technique of powder coating technology and give rise to homogeneously colored coatings having a very good surface. In comparison with the known powders, the novel pulverulent coating compositions do not experience any separation of the pigment particles from the polymer particles, nor of the different-colored coating compositions employed from one another, in the course of processing to form powder coat finishes. Furthermore, it is not necessary to agglomerate the spherical particles present in the coating composition before spraying them as a powder coating. Consequently, the coatings produced in this way feature a highly homogenous, uniform coloration and an excellent hiding powder. In the continuous coatings formed, the differences in color which stem from the different particles are impossible for the human eye to distinguish.

In comparison with other coating compositions, known in the prior art, which usually result in a coating thickness of from 50 to 70 μm, it is possible by means of the powder as described herein to produce homogeneously colored coats having thicknesses <50 μm, preferably coatings having thickness in the range from 5 to 40 μm, in particular from 10 to 35 μm.

The following examples illustrate the invention:

EXAMPLES

Example 1

Preparation of crosslinkable coatings

By the process described in Example 3 in German Patent Application 19705962.7, the following colored powders were prepared:

Powder 1: Corresponds to number 2 in Example 2, colored with 5% of the pigment PV Fast Red, mean particle size 28 μm.

Powder 2: Corresponds to number 4 in Example 2, colored with 5% of the pigment PV Fast Blue, mean particle size 29 μm.

Powder 3: In analogy to the general procedure in Example 2 of 19705962.7 a colorless powder was prepared by adding a dispersion of 150 g of barium sulfate, and 3.5 g of ®Antaron (ISP Global) at 200° C. The white powder obtained has a mean particle size of 25 μm.

Powder 4: Transparent powder coating prepared in accordance with Example 2b of German Patent Application 19705961.9, mean particle size 19 μm.

Conducting the mixing experiments:

The powders were weighed out into a plastic container in the proportions stated in Table 1 and were mixed thoroughly by means of manual shaking. The powder mixtures obtained already showed the desired mix color. The powder mixtures were subsequently applied by spraying with a tribological powder spray gun to aluminum panels with a thickness of about 0.9 mm. Curing of the coating at 180° C. for 20 minutes produced homogeneous coatings having an excellent surface. The color of the coatings is uniform over the entire area. The film thicknesses obtained are listed in Table 1.

TABLE 1

| No. | Component 1 | Component 2 | Component 3 | Film thickness (μm) | Color |
|---|---|---|---|---|---|
| 1 | Powder 1 90 g | Powder 3 10 g | — | 30 | Strong blue |
| 2 | Powder 1 50 g | Powder 3 50 g | — | 28 | Pale blue |
| 3 | Powder 1 10 g | Powder 3 90 g | — | 25 | Very pale blue |
| 4 | Powder 1 20 g | Powder 2 80 g | — | 34 | Red-violet |
| 5 | Powder 1 50 g | Powder 2 50 g | — | 26 | Bright violet |
| 6 | Powder 1 80 g | Powder 2 20 g | — | 32 | Dark violet |
| 7 | Powder 1 30 g | Powder 2 30 g | Powder 3 40 g | 25 | Pale violet |
| 8 | Powder 1 50 g | Powder 4 50 g | — | 23 | Pale blue with less hiding power than No. 1 |

Example 2

Preparation of thermoplastic coatings

By the process described in Example 3 in German Patent Application 19705962.7, the following powders are prepared:

Powder 5: Corresponds to No. 4, colored with the pigment PV Fast Yellow, mean particle diameter: 32 μm.

Powder 6: Corresponds to No. 5, colored with the pigment PV Fast Blue, mean particle diameter 34 μm.

Powder 7: Corresponds to No. 1, colored with the pigment ®Hostaperm (Hoechst) Violet RI, mean particle diameter; 19 μm.

Powder 8: As described in Example 4d of German Patent Application 19705961.9, a colorless powder having a mean particle diameter of 16.6 μm is prepared.

Conducting the mixing experiments:

The powder were weighed out into a plastic container in proportions stated in Table 2 and were mixed thoroughly by means of manual shaking. The powder mixtures obtained already showed the desired mix color. The powder mixtures were subsequently applied by spraying with a tribological powder spray gun to aluminum panels with a thickness of about 0.9 mm. Melting of the coating at 190° C. for 10 minutes produced homogeneous coatings having an excellent surface. The color of the coatings is uniform over the entire area. The film thickness obtained are listed in Table 2.

TABLE 2

| No. | Component 1 | Component 2 | Component 3 | Film thickness (μm) | Color |
|---|---|---|---|---|---|
| 1 | Powder 5 10 g | Powder 6 90 g | — | 28 | Dark green |
| 2 | Powder 5 50 g | Powder 6 50 g | — | 30 | Mid-green |
| 3 | Powder 5 20 g | Powder 6 80 g | — | 27 | Light green |
| 4 | Powder 5 25 g | Powder 6 25 g | Powder 8 50 g | 25 | Mid-green with less hiding powder than No. 2 |
| 5 | Powder 8 90 g | Powder 7 10 g | — | 20 | Transparent coating with a pale violet coloration |

What is claimed is:

1. A colored pulverulent coating composition comprising spherical particles having a mean particle size >40 μm, in two or more different color tints, where at least the particles of one tint are colored and the particles of the other tint may be colorless, wherein the particles employed for the mixture each have a monomodal particle size distribution with a span (d90-d10/d50) of <2.5 and the pulverulent coating composition can be melted at temperatures <200° C. to form a continuous coating, the differences in color which stem from the different-colored particles being indistinguishable to the human eye in the cured coating.

2. The coating composition as claimed in claim 1, wherein the mean particle size (d50) of the spherical particles is in the range from 40 μm to >10 μm.

3. The coating composition as claimed in claim 1, which can be used to produce coatings having a thickness <50 μm.

4. The coating composition as claimed in claims 1, which as binder comprises polyesters which can be crosslinked if desired.

5. The coating composition as claimed in claims 1, wherein the colored particles comprise units of the formulae (1) and (2)

(1)

(2)

where

X is a substituted or unsubstituted $C_6$ to $C_{14}$ aromatic radical or an alkylene, polymethylene, cycloalkane or dimethylene cycloalkane group or a straight-chain or branched, saturated or unsaturated alkanediyl group and D is an alkylene, polymethylene, cycloalkane or dimethylene cycloalkane group or a straight-chain or branched, saturated or unsaturated alkanediyl group.

6. The use of the coating composition as claimed in claim 1 for powder coatings.

7. A process for preparing a colored pulverulent locating composition in a desired color, by providing at least one coating composition in a base color and at least one further, differently colored or colorless, coating composition and mixing the coating compositions, wherein each of the coating compositions employed comprises spherical particles having a mean particle size <40 μm and wherein, on application of the coating composition to a substrate at temperatures <200° C., a continuous coating in the desired color is formed, in which the differences in color which stem from the different particles are indistinguishable to the human eye.

* * * * *